United States Patent [19]

Ide

[11] Patent Number: 5,559,383
[45] Date of Patent: Sep. 24, 1996

[54] MOTOR BEARING WITH RESILIENT GUIDE

[76] Inventor: Russell D. Ide, 122 Ridge Dr., Exeter, R.I. 02822

[21] Appl. No.: 483,705

[22] Filed: Jun. 7, 1995

Related U.S. Application Data

[63] Continuation of Ser. No. 206,639, Mar. 7, 1994, Pat. No. 5,436,515, which is a continuation-in-part of Ser. No. 118, 195, Sep. 9, 1993, Pat. No. 5,321,328, which is a continuation-in-part of Ser. No. 991,461, Dec. 16, 1992, abandoned.

[51] Int. Cl.$^6$ .............................. H02K 7/08; H02K 5/12
[52] U.S. Cl. ................................ 310/90; 310/87
[58] Field of Search .............................. 310/87, 90, 114; 384/58, 126, 127, 278

[56] References Cited

U.S. PATENT DOCUMENTS

| | | | |
|---|---|---|---|
| Re. 28,094 | 7/1974 | Boyd | 310/90 |
| 2,171,749 | 9/1939 | Hollander et al. | 172/36 |
| 2,315,917 | 4/1943 | Arutunoff | 172/36 |
| 3,518,471 | 6/1970 | Wightman et al. | 310/85 |
| 3,551,714 | 12/1970 | Boyd | 310/87 |
| 3,663,847 | 5/1972 | Schaefer | 310/90 |
| 3,883,159 | 5/1975 | Whitley, Jr. | 280/414 R |
| 3,963,281 | 6/1976 | Reigler et al. | 384/58 |
| 4,119,874 | 10/1978 | Beavers et al. | 310/90 |
| 4,329,122 | 5/1982 | Owada et al. | 417/365 |
| 4,350,911 | 9/1982 | Wilson et al. | 310/87 |
| 4,435,661 | 3/1984 | Witten | 310/90 |
| 4,453,099 | 6/1984 | Flat | 310/87 |
| 4,513,215 | 4/1985 | Del Serra | 310/90 |
| 4,521,708 | 6/1985 | Vandevier | 310/87 |
| 4,636,672 | 1/1987 | Iwata et al. | 310/87 |
| 4,638,198 | 1/1987 | Cochran | 310/87 |
| 4,672,249 | 6/1987 | Iwata et al. | 310/90 |
| 4,686,403 | 8/1987 | Hackstie et al. | 310/90 |
| 4,777,697 | 10/1988 | Berndt | 16/21 |
| 5,003,210 | 3/1991 | Liu et al. | 310/87 |
| 5,128,573 | 7/1992 | Liu et al. | 310/87 |
| 5,189,328 | 2/1993 | Knox | 310/90 |
| 5,321,328 | 6/1994 | Ide | 310/90 |
| 5,436,515 | 7/1995 | Ide | 310/90 |

FOREIGN PATENT DOCUMENTS 1161726  8/1969  United Kingdom ..................... 384/58

Primary Examiner—Clayton E. LaBalle
Attorney, Agent, or Firm—Michael D. Bednarek; Kilpatrick & Cody

[57] ABSTRACT

An elongated electric motor having an annular stator with laminations and a segmented rotor on a shaft bearing assemblies provided between the rotor segments support the shaft and rotor. The bearing assemblies include a sleeve for supporting the shaft and a support portion adjacent the stator. The outer-periphery of the support portion is made resilient, preferably by the provision of resilient elements about its periphery. For example, a plurality of wheels may be disposed on the outer periphery. The wheels inhibit rotation of the bearing while at the same time permitting easy longitudinal movement of the bearing relating to the stator. The wheels are provided with a spring characteristic by mounting on an axle which is supported for deflection or supported in elastomeric bushings or, alternatively, the axle is supported in a cantilever fashion. Wheels may also be formed of a compressible elastomeric material. Alternatively, a structural spring may be provided at the outer periphery of the support position of the bearing.

17 Claims, 6 Drawing Sheets

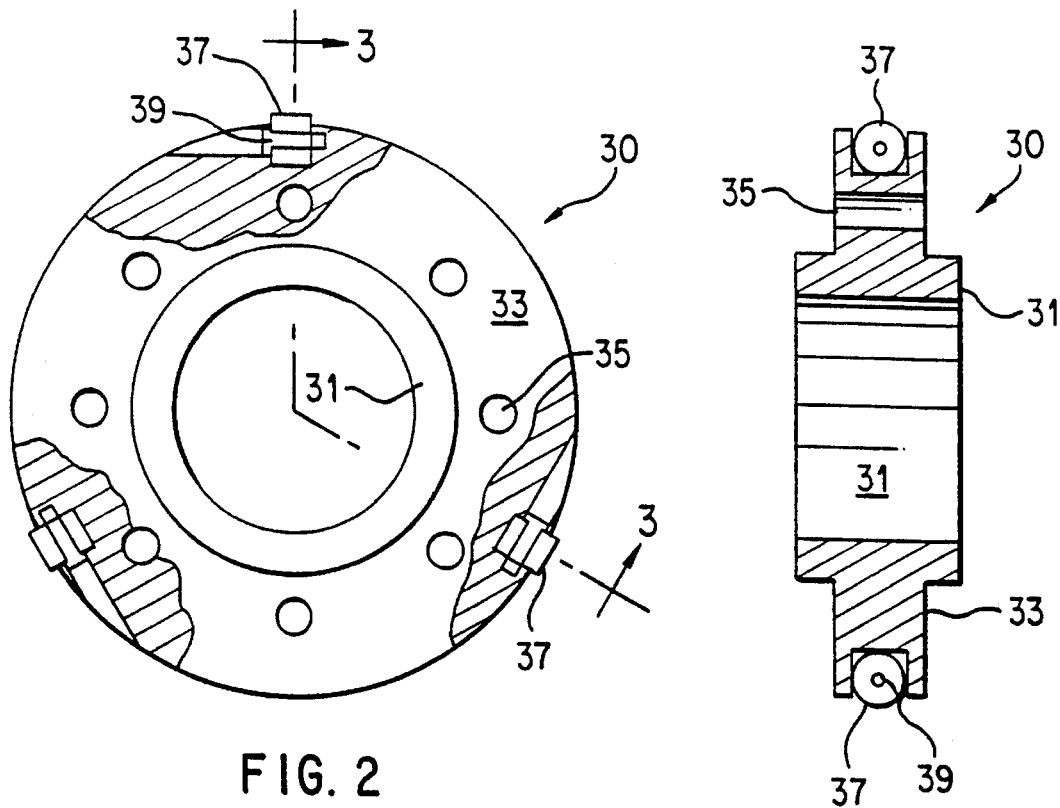
FIG. 2
FIG. 3
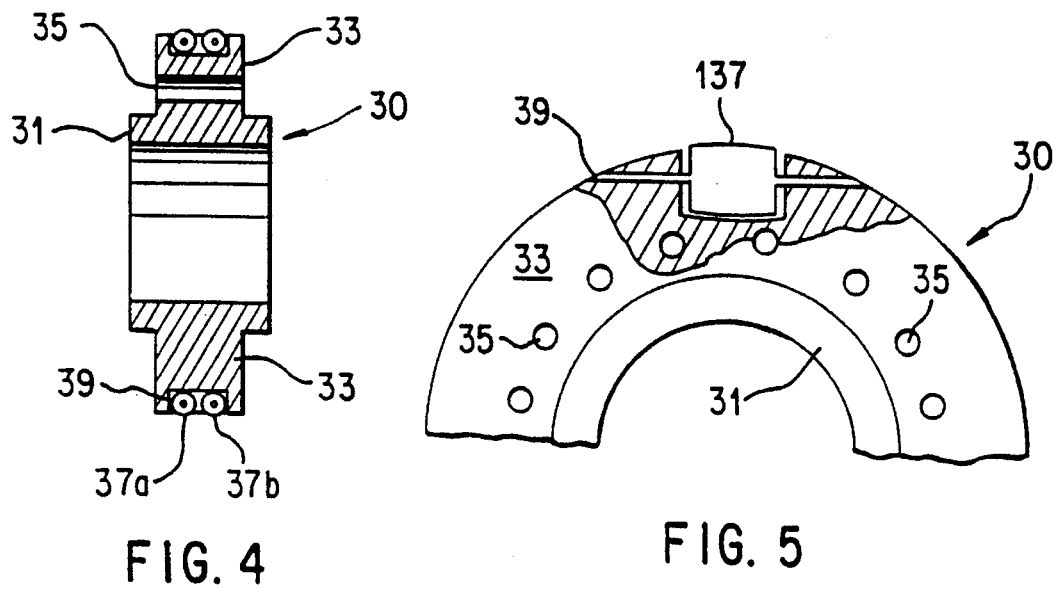
FIG. 4
FIG. 5

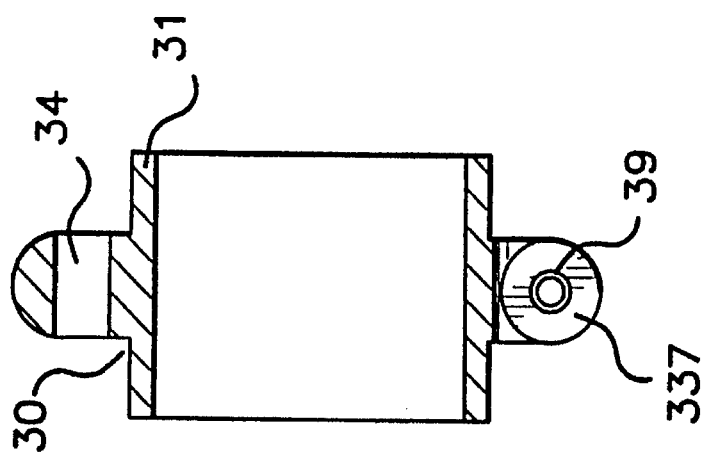
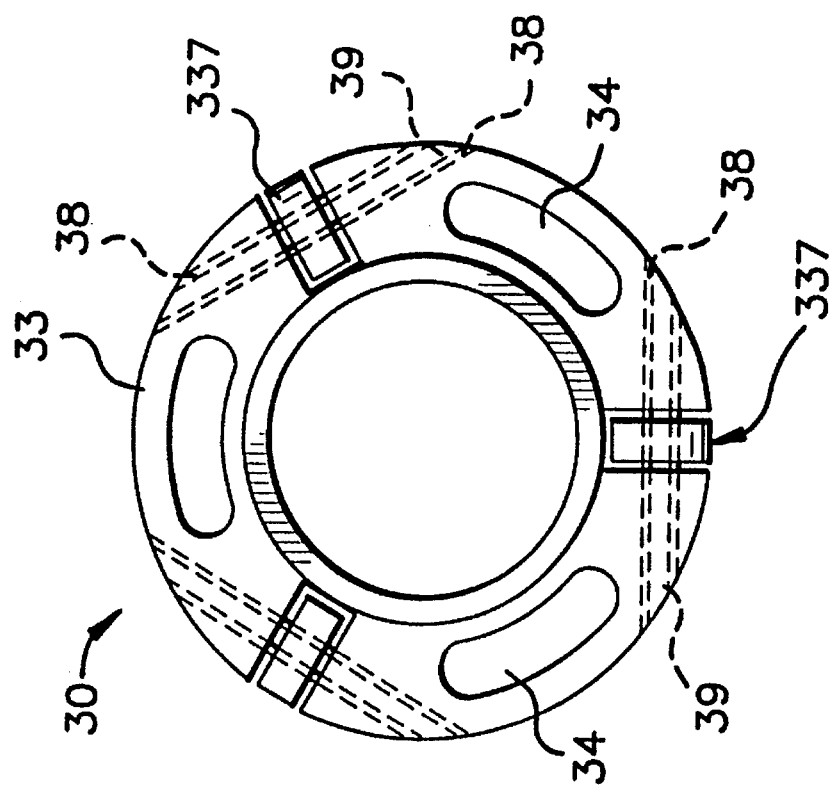

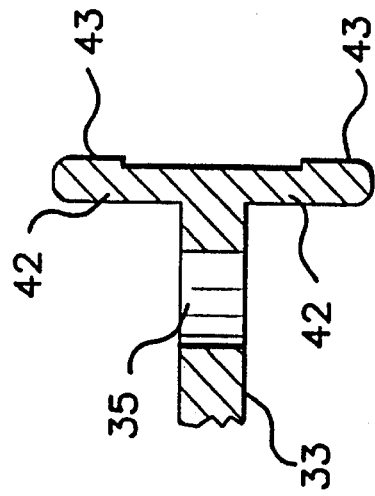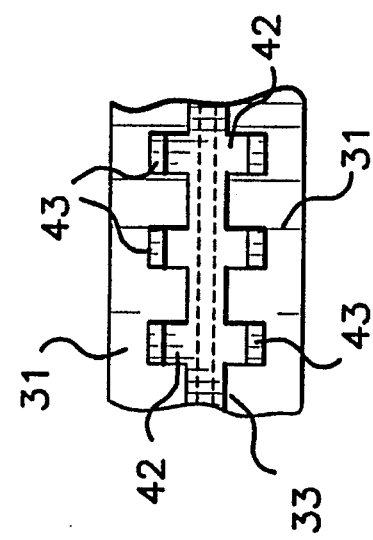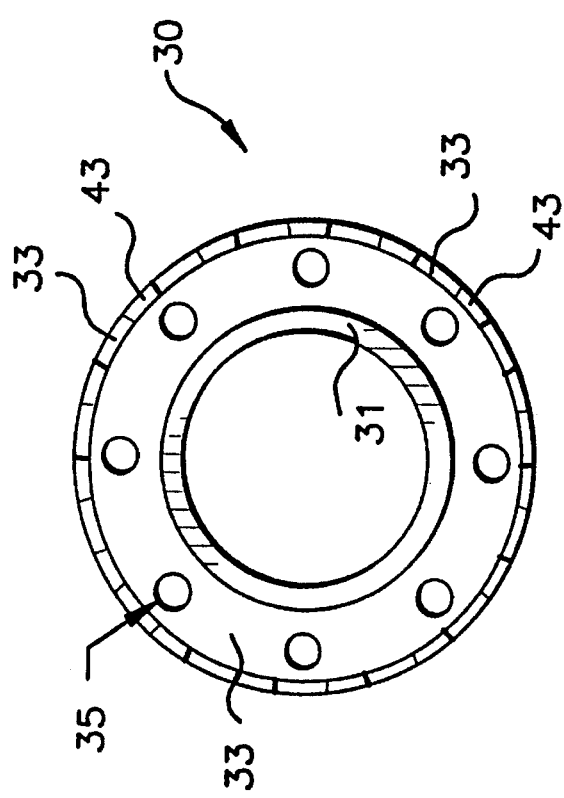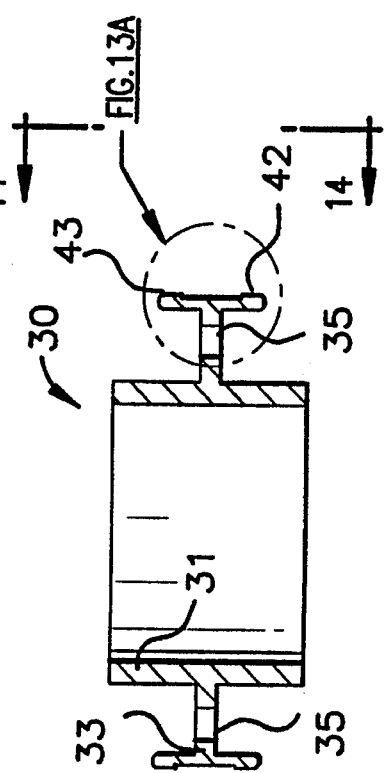

MOTOR BEARING WITH RESILIENT GUIDE

This application is a continuation of application Ser. No. 08/206,639 filed Mar. 7, 1994 now U.S. Pat. No. 5,436,515, which is a continuation-in-part of applicant's corresponding application Ser. No. 08/118,195 filed Sep. 9, 1993, now U.S. Pat. No. 5,321,328 and entitled "Motor Bearing With Rotatable Guide" which was a continuation-in-part of an application of the same title having U.S. Ser. No. 07/991,461 filed on Dec. 16, 1992, now abandoned.

FIELD OF THE INVENTION

This invention relates in general to submersible pump motors, and in particular to a bearing assembly located between rotor sections for supporting the shaft of the motor.

DESCRIPTION OF PRIOR ART

A submersible pump is a centrifugal pump having a submersible motor that rotates the shaft to drive the pump. The motors for high volume oil and water production typically range from eight to forty feet in length and be rated at several hundred horsepower. The diameter of the pumps cannot exceed the diameter of the well bore. Consequently, the motors must drive a long slender electric motor to obtain the required horsepower.

While specific constructions vary, they have several common features that make the present invention widely applicable. To begin with, each motor includes a long tubular housing. Individual stator plates are slipped in the tube to form a tubular stator secured within a tubular housing. The dimensions of these plates vary enough that the clearance of the passage formed by the stacked plates has a relatively large tolerance. A rotor secured to a shaft rotates within the stator.

Because of the long length, the rotor is typically made up of a number of rotor sections typically about three feet long. Each rotor section comprises a large number of flat disks called laminations that are secured by copper rods. The rotor sections are spaced-apart from each other, and a radial bearing is located between each section for maintaining the shaft in axial alignment.

Because of the long lengths between the rotors are radial bearings and the variation in the clearance in the opening provided in the stator, the bearings must have ID and OD clearance to be installed. Additionally they must be free to slide to accommodate thermal expansion of the shaft tube and rotors. The OD clearance becomes a problem by causing rotor instability. A sleeve is typically keyed to the shaft for rotation therewith. The radial bearing supports the shaft at this sleeve. In addition, the bearing has a bore with a periphery that frictionally engages the inner wall of the stator at operating temperatures to prevent the bearing from rotating and to support the shaft in alignment.

As the motor heats up to operating temperature, the bearing will expand slightly outward to grip the stator more tightly. Also, the rotor will likely grow longitudinally at a rate greater than the stator, causing the bearing to move longitudinally with respect to the stator.

Because of the length of the motor, the bearing must be precisely dimensioned so that it can be assembled into the shaft and so that it does not engage the stator wall so tightly as to create excessive thrust loads on the bearing member. This is particularly difficult since there can be some variation in the inner diameter of the opening into which the bearing's outer periphery fits. The bearings must also be free to slide to accommodate thermal expansion of the shaft tube and rotors. For accurate dimensioning, the bearing is normally constructed of a metal with an outer wall ground to a 0.0005 inch tolerance. In conventional assemblies, the bearing sometimes spins with the shaft, causing heat and metal surfaces galling which ultimately leads to oil contamination and dielectric breakdown.

Proposals have been made to prevent the bearing from rotating with the shaft. For example, U.S. Pat. No. 4,513,215 discloses an annular elastomer for fitting about the bearing periphery is shown. The elastomer swells during operation to engage the stator inner wall to prevent rotation of the bearing.

U.S. Pat. No. 4,521,708 discloses a bearing provided with pins which move outward during operation to prevent rotation of the bearing. The pins are located in radial cavities spaced around the periphery of the bearing. The pins are located so as to engage gaps provided between the slot teeth of the stator laminations. A coil spring behind each pin pushes the pin outwardly into the gap to resist rotation of the bearing. Each pin has a piston portion, which augments the force of the spring by hydraulic pressure created in the inner diameter of the bearing.

U.S. Pat. No. 4,119,874 discloses a bearing in which an elongated electric motor constructed with a stator of magnetic laminations are each provided with an annular, peripheral groove and a spring means is positioned in each groove in juxtaposition to the adjacent stator laminations. Each spring is a corrugated, metallic strip to frictionally engage portions of the bearing means and the adjacent stator laminations. When such a motor is energized, the motor shaft and the attached rotor sections rotate within the bearing means which, even while being positioned in a magnetic field, do not rotate and cause the problems previously encountered in such motors, as set out in the background portion of this specification. The spring permits axial movement of the shaft is elongation occurs due to unequal heating of the shaft and stator.

But there is a problem with such structures. Assembly is difficult and tolerances are very tight.

SUMMARY OF THE INVENTION

The present invention provides an elongated electric motor for a submersible pump, which includes a housing filled with lubricating fluid. A stator is mounted in the housing and has an inner wall. A rotatable shaft is mounted within the stator. A rotor composed of spaced-apart rotor sections is mounted on the shaft. A bearing is mounted between each of the rotor sections. The bearing has an inner diameter and an outer periphery. In accordance with an important aspect of the present invention, the outer periphery of the bearing is resilient to provide an interference to fit between the outer periphery of the bearing and the stator. Preferably the resilience of the outer periphery is achieved by providing resilient elements that project radially outward to define the outer periphery of the bearing. These resilient elements can be pressed radially inward to allow the bearing to be positioned within the stator. Once in position, however, the resilience or spring characteristic of the resilient elements pushes the elements radially outward to provide the desired interference fit with the stator.

There are, of course, many ways to provide a resilient outer periphery in the bearing. In accordance with the currently preferred embodiment of the present invention, a plurality of wheels are carried by each of the bearings. A portion of the wheels extends radially outward of the remainder of the bearing to define the outer periphery of the wheels. The wheels are aligned to permit longitudinal movement but inhibit rotation of the bearing relative to the stator. The wheels may be mounted for rotation on an axle shoulder bolt, if desired.

Preferably, each bearing includes at least three circumferentially spaced wheels. If desired, each bearing assembly may include a plurality of sets of circumferentially spaced wheels with each set of wheels comprising at least two longitudinally spaced wheels.

The wheels may have a concave cross-section which conforms to the inner wall of the stator and may be formed of rubber or some other elastomer to give the wheels a resilience or spring characteristic to, among other things, compensate for manufacturing tolerances. Alternatively, or in addition, the resilience or spring characteristic may be provided in the axle on which the wheels are supported. For example, the axle may be mounted in an elastomeric cushion or busing. The axle may also be supported in a cantilever fashion for deflection under load.

As mentioned above, there are other ways of providing resilient elements or otherwise providing resilience at the outer periphery of the bearing. For example, the outer periphery may be designed as a structural spring. In one embodiment according to the present invention, resilient elements—in the form of resiliently mounted feet—are provided at the outer periphery of the motor bearing. The feet are provided on the unsupported end of cantilever beam-like extensions that extend axially from the outer edge of the bearing. Because of the cantilever nature of their support, the feet are resilient in the radial direction.

These and other aspects of the present invention will now be described in detail in conjunction with the attached drawings.

BRIEF DESCRIPTION OF THE DRAWINGS

FIG. 2 is an end view, partially in section, of a bearing assembly according to the present invention.

FIG. 3 is a sectional view of the bearing assembly of FIG. 2 along the lines indicated in FIG. 2.

FIG. 4 is a sectional view of another bearing assembly according to the present invention.

FIG. 5 is a partial end view, partially in section, of another bearing assembly according to the present invention.

FIG. 10 is an end sectional view of the currently preferred embodiment of the present invention.

FIG. 11 is a sectional view of the bearing assembly of FIG. 10 along the lines indicated in FIG. 10.

FIG. 12 is an end sectional view of an embodiment of the present invention that includes resilient feet instead of resilient wheels.

FIG. 13 is a sectional view of the bearing assembly of FIG. 12 along the lines indicated in FIG. 12.

FIG. 13A is a detail view of a portion of the bearing assembly of FIG. 13 as shown in FIG. 13.

FIG. 14 is a flat pattern side view of a portion of the bearing assembly of FIG. 13 as shown in FIG. 13.

DETAILED DESCRIPTION

Figure 1:
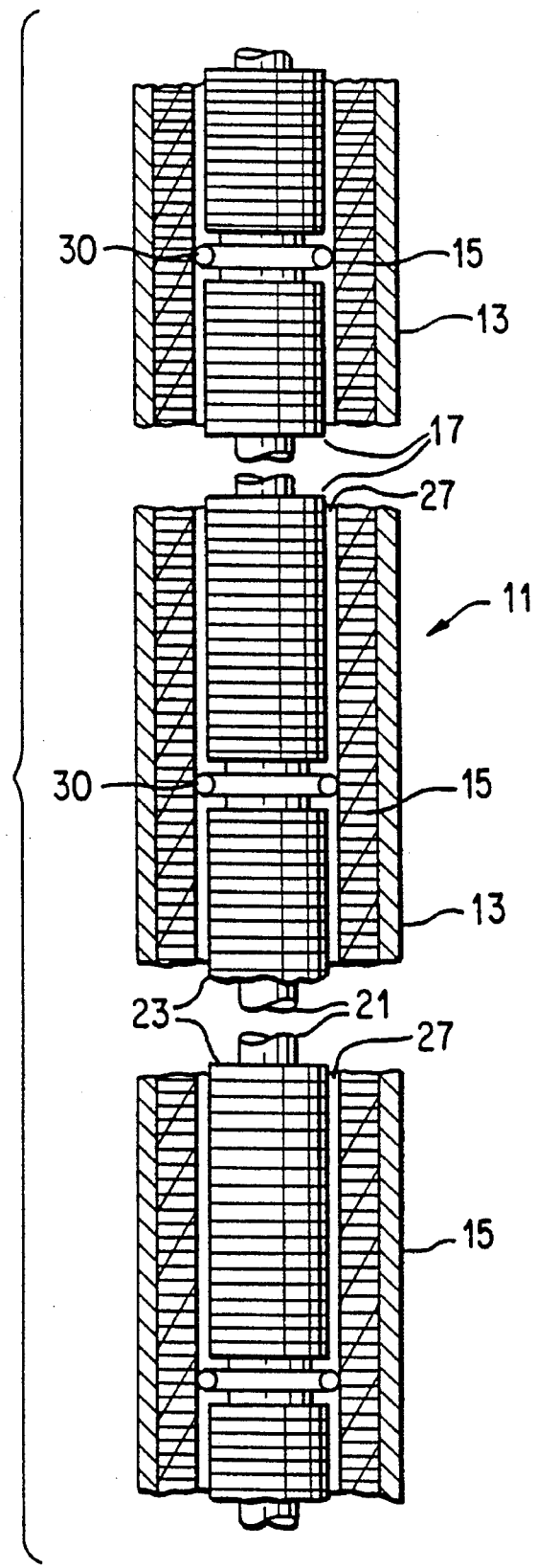
FIG. 1 is a fragmentary view of an elongated electric motor, partially in section.

FIG. 1 illustrates, somewhat schematically, the overall arrangement of the electric motor, of the present invention. As shown therein, the elongated electric motor 11 includes a tubular housing 13, a stator 15 and a rotor 17. The stator 15 is composed of a plurality of laminations of magnetic material. The stator 15 is fixed to the housing 13. The rotor is also preferably composed of a plurality of laminations.

A rotatable shaft 21 extends beyond the ends (not shown) of the stator 15 and may be provided with conventional radial and thrust bearings (also not shown) at the ends thereof. The shaft is concentric with the housing 13 and the stator 15, and provides a mounting for the rotor 17.

A series of rotor sections 23 surround the shaft 21 at axial intervals and are separated to allow sufficient space for an alternative series of radial bearings 30. The rotor sections additionally have an outer diameter smaller than the inner dimension of the stator 15 establishing an air gap 27 to allow axial flow of coolant from a source (not shown). The length of the shaft 21 is determined by the number of rotor sections required to provide a motor of adequate horsepower for the application in which it is to be used. Motors having a length of 40 feet or more are not unknown. The number of bearings 30 and their spacing is a function of the mechanical strength of the shaft 21, the air gap tolerance and other particular design parameters. The alternating rotor/bearing combination extends the length of the stator 15.

It is important that the bearing 30 does not rotate with the shaft, but instead remain stationary with the stator. This presents something of a dilemma because of the length of the motor assembly. Specifically, since the motor is assembled by sliding the rotor segments 17 and the bearings 30 down the shaft, there must be some clearance between the outer diameter of the bearings 30 and the inner diameter of the stator 15. On the other hand, this clearance or looseness can cause the bearing to rotate with the shaft 21 relative to the stator 15.

In accordance with the present invention, however, the bearing 30 is designed to accommodate both the need for the bearing 30 to slide relative to the stator 15 and the need to remove any spacing between the bearing 30 and the stator 15. Specifically, as shown in FIG. 1 the bearings 30 are provided with a plurality of circumferentially spaced wheels to allow the bearing 30 to slide longitudinally relative to the stator 15, but to provide a tight radial fit between the bearing 30 and stator 15 in a way which substantially inhibits rotation between the bearing and the stator.

The construction of the bearings 30 of the present invention will be described in further detail below in connection with FIGS. 2–9.

A first embodiment of the radial bearing assembly of the present invention is shown in detail in FIGS. 2 and 3. As shown the bearing 30 comprises a cylindrical sleeve portion 31 for supporting the rotating shaft. A radially outward extending support portion 33 extends radially outward from the sleeve portion 31 of the bearing 30. A plurality of passages or fill holes 35 extend through the support portion 33 to permit passage of oil contained within the housing 13.

As with conventional constructions, the radially outer periphery of the support portion 33 has a dimension which is slightly less than the radially inner dimension of the stator 15 such that there is a small clearance between the support portion 33 and the stator 15. In accordance with the present invention, however, a plurality, in this case three, circumferentially spaced wheels are provided on the outer periphery of the support portion 33.

The wheels 37 are mounted on a axle 39 for rotation about an axis which is transverse to the longitudinal axis of the bearing. The wheels 37 may be mounted on any suitable axle, but in the embodiment shown in FIGS. 2–3 the axle is in the form of an axle shoulder bolt 39 having a head at one end, a threaded portion at the other end and a smooth axle portion in between. By virtue of their support on these axles, the outer surface of the wheels are supported for movement in the same direction as the longitudinal axis of the bearing 30. On the other hand, the axles 39 support the wheels 37 such the outermost surface of the wheels 37 extends beyond the outer peripheral of the support member 33 so that the wheels 37, not the support member 33, define the outer peripheral of the bearing assembly 30. Thus, when assembled in a submersible pump motor of the type shown in FIG. 1 the wheels 37 are in contact with the stator 15.

Because of the way the wheels are mounted, the wheels permit the bearing assembly 30 to be displaced longitudinally with respect to the stator 15 and in fact simplify such movement by providing simple rolling contact with the stator. On the other hand, the wheels 37 inhibit rotation of the bearing assembly 30 with respect to the stator because they provide direct frictional contact with the stator.

The wheels can be formed of any suitable material including metal, polymer and rubber. Rubber or some other elastic material offers a number of advantages for these embodiments. First, an elastic material such as rubber generally will have a relatively high coefficient of friction which will aid in resisting rotation of the bearing assembly 30. In addition, a material such as rubber which has a certain dampening characteristic will serve as a vibration damper to dampen any movements the bearing assembly 30. The spring characteristic which results from the use of an elastomeric material also provides enough play to compensate for manufacturing tolerances. This is discussed further below in connection with FIGS. 6–9.

In the embodiment illustrated in FIGS. 2–3, three circumferentially equi-spaced wheels 37 are provided on each bearing assembly 30. Evenly spacing the wheels ensures a balanced sliding support of the bearing assembly 30. Naturally, additional wheels could be provided and the spacing of the wheels could be varied, if desired.

Other variations of the present invention are possible. FIG. 4 shows one such variant in which each bearing assembly 30 includes a plurality of sets of circumferentially spaced wheels. Each set of wheels includes a plurality, in this case two, longitudinally spaced wheels 37a and 37b. The use of sets of longitudinally wheels, wheels which include two or more wheels provides additional stability and greater resistance to rotation.

Another variation of the present invention is shown in FIG. 5. As shown the wheels may be provided with a concave or tapered profile such as wheel 137. The profile of the wheel 137 may be selected to closely conform to the outer periphery of the support member 33. This serves several purposes. First, the difference in radial dimension between the wheels 137 and the outer periphery of the support member 33 is substantially reduced so that the wheels 137 provide even less resistance to longitudinal sliding of the bearing assembly 30 along the stators. In addition, the profile of the wheels 137 conforms more closely to the inner periphery of the stator so that the area of contact between the wheels 137 and the stator is increased resulting in greater resistance to rotation of the bearing assembly 30.

In the assembly shown in FIG. 5, a pin type axle 139 is used as an alternative to the axle shoulder bolt shown in FIGS. 2 and 3. Naturally, other forms of axles could be used, if desired.

As mentioned above, in accordance with the present invention, the wheels may be mounted with a spring characteristic so that the wheels have a certain amount of radial play. The provision of such radial play provides a number of advantages. First, it compensates for manufacturing tolerances and allows a tighter fit between the support member and the stator. In this regard, it should be noted that the provision of radial play does not significantly lessen the resistance to rotation. Thus, by providing radial play the bearing assemblies 30 can be snugly fit into the stator 15 without tight manufacturing tolerances. The tight fit permits high rotational speeds which leads to higher capacity and improved performance. Without such a tight fit, it is sometimes necessary to provide shims to lock the bearing assembly in place. Providing radial play in the wheel eliminates the need for such shims. Finally, because of the radial play in the wheels, assembly of the bearings into the stator is simplified since the wheels are capable of self-adjusting to the precise position required.

There are a number of different ways in which the wheels may be provided with radial play. Examples of bearing assemblies in which the wheels have been provided with a certain amount of radial play are shown in FIGS. 6–9 and discussed below.

Figure 6:
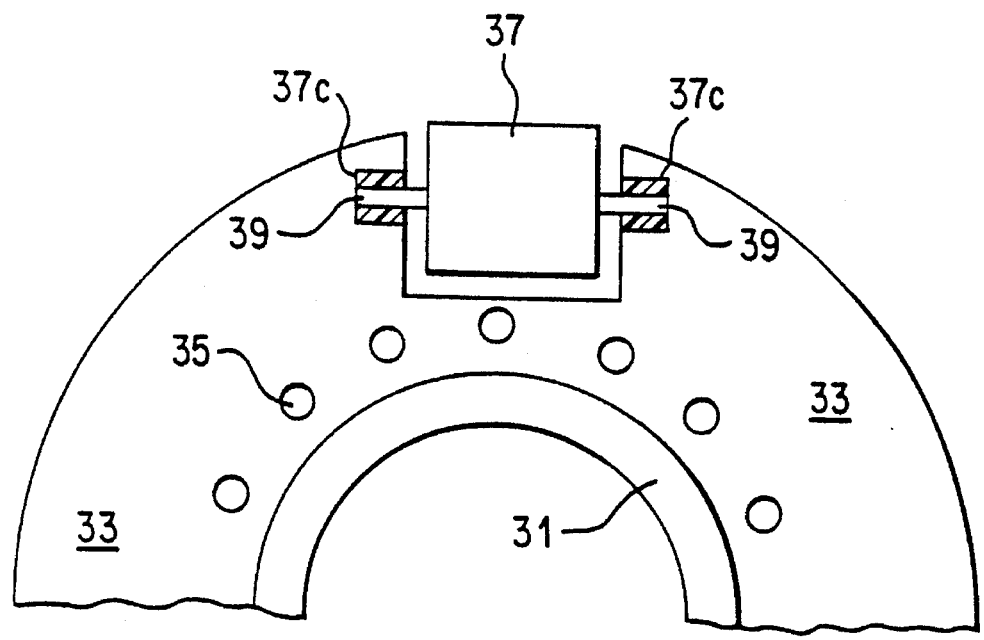
FIG. 6 is a partial end view, partially in section, of a bearing assembly in which the wheel axles are supported in elastomeric bushings or cushions.

FIG. 6 is a partial end view, partially in section of a bearing assembly in which the wheel axles 39 are supported in elastomeric bushings or cushions 37c. In this case, the wheels 37 and axles 39 may be formed of a hard durable material such as steel, but by virtue of the provision of the elastomeric bushings 37c, the wheels 37 and axles 39 have some degree of radial play since a radial force acting on the wheel 37 will cause compression of the elastomeric bushing 37c and permit the wheel 37 to be displaced radially inward. Naturally, the provision of elastomeric cushions 37c is not limited to wheel and axle assemblies formed of hard material and having the specific shape shown in FIG. 6. For example, an elastomeric cushion 37c could be used to support the axle 39 of the wheel 137 shown in FIG. 5, if desired. The provision of the elastomeric bushing 37c is, however, particularly useful in applications such as that shown in FIG. 6 where both the roller 37 and axle 39 are relatively rigid.

Figure 7:
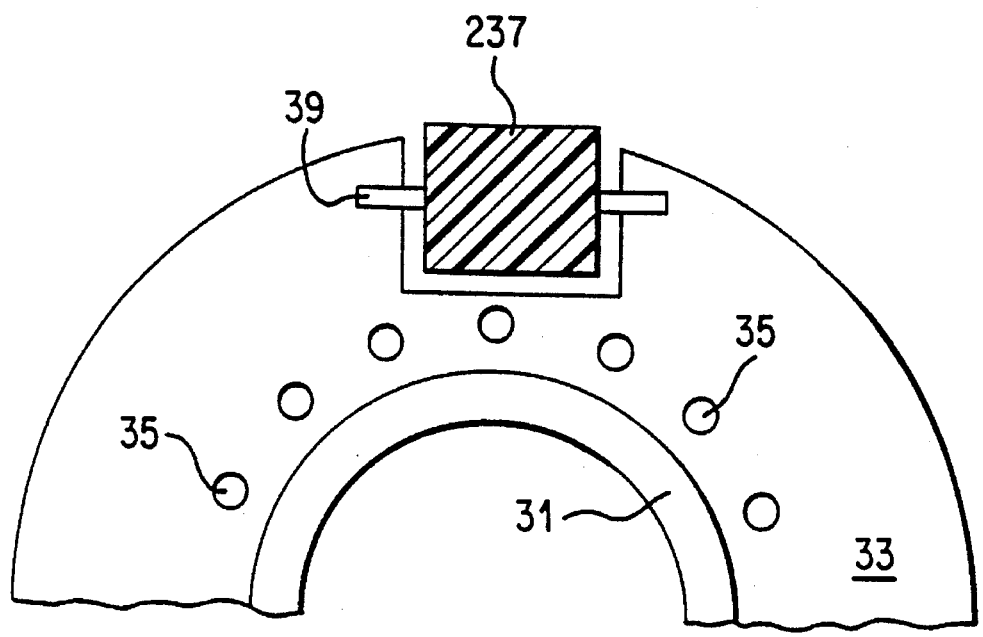
FIG. 7 is a partial end view, partially in section, of a bearing assembly which includes an elastomeric wheel.

FIG. 7 shows another arrangement for providing radial play in the wheel. In this case, the wheel 237 is formed of an elastomeric material such as rubber which is compressible. The axle 39 is formed of a relatively rigid material. By virtue of this construction, the wheel 237 is radially compressible so as to provide radial play when force is applied against the periphery of the roller 237. As noted previously, the provision of an elastomeric wheel 237 allows the outer periphery of the wheel 237 to conform to the surface of the stator to ensure a tight fit. Again, the tight fit between the wheels 237 and the stator 15 allows high rotational speeds which improves the capacity and performance of the motor.

Figure 8:
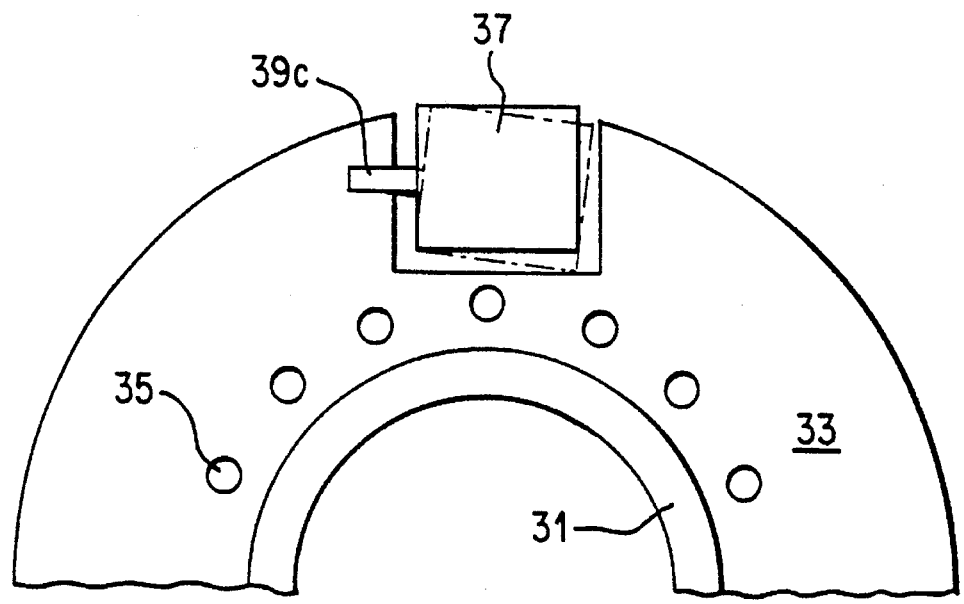
FIG. 8 is a partial end view, partially in section, of a bearing assembly in which the wheel axle is supported in a cantilever fashion.
Figure 9:
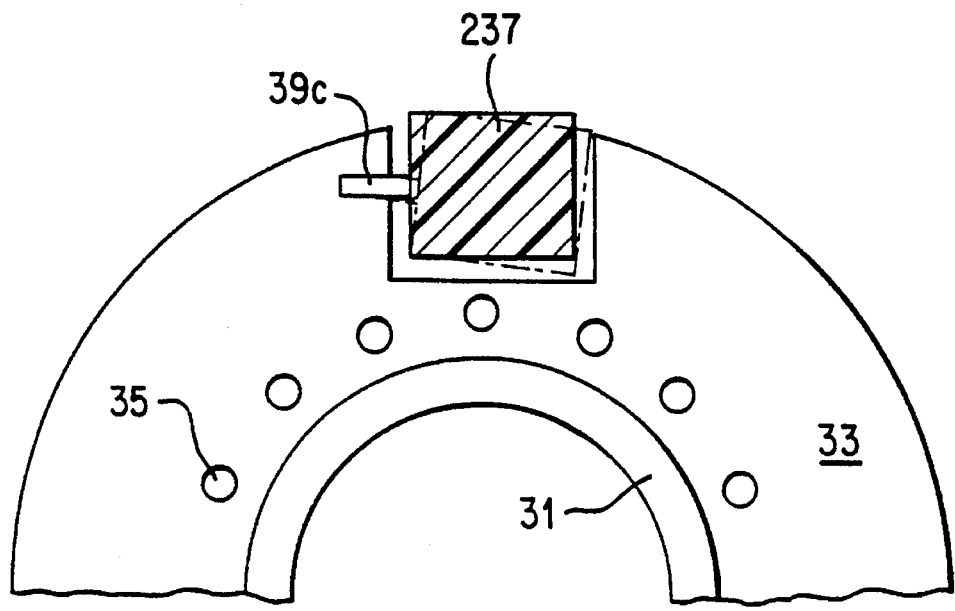
FIG. 9 is a partial end view, partially in section, of a bearing assembly having an elastomeric wheel which rotates on an axle supported in a cantilever fashion.

FIGS. 8 and 9 illustrate another possible arrangement for providing the wheels with radial play. Specifically, the wheels 37, 237 may be mounted on an axle 39c which is supported as a cantilever in the support member 33. Since the wheels 37, 237 are supported on a cantilever axle 39c, radial loads applied to the outer periphery of the wheels 37, 237 will cause deflection of the axle 39c to permit radial movement of the wheels 37, 237 as shown in phantom in FIGS. 8 and 9. Thus, the wheels 37, 237 are able to move radially inward to fit within the stator 15. The deflected axle 39c then urges the wheels 37, 237 tightly against the stator to ensure a tight fit between the wheels 37, 237 and the stator.

As shown in FIG. 8, the wheel 37 may be formed of a hardened material such as steel. Alternatively, as shown in FIG. 9, the wheel 237 may be formed of a soft material such as an elastomer-like rubber.

With the foregoing in mind, FIGS. 10–11 illustrate the currently preferred embodiment of the present invention. This preferred embodiment is similar to the previously described embodiments in many respects. The bearing 30 comprises a cylindrical sleeve portion 31 for supporting the rotating shaft. A radially outward extending support portion 33 extends radially outward from the sleeve portion 31 of the bearing 30. A plurality of elongated passages or fill holes 34 extend through the support portion 33 to permit passage of oil contained within the housing 13. In this regard, the elongated passages perform the same function as the passages or fill holes 35 of previously described embodiments.

As with the previously described constructions, the radially outer periphery of the support portion 33 has a dimension which is slightly less than the radially inner dimension of the stator 15 such that there is a small clearance between the support portion 33 and the stator 15. Again, however, a plurality of circumferentially spaced wheels are provided on the outer periphery of the support portion 33.

In this preferred embodiment, the wheels 337 are mounted on an axle 39 for rotation about an axis which is transverse to the longitudinal axis of the bearing. In this regard, the embodiment of FIGS. 10 and 11 are somewhat similar to that of FIG. 5. There are, however, differences.

In the preferred embodiment of FIGS. 10 and 11 the wheels 337 are relatively rigid. Preferably, the wheel is made of steel. This gives the wheels high strength and temperature characteristics which are beneficial when operating downhole. In fact, the wheel itself is preferably a simple roller bearing with the outer race serving as the periphery of the wheel. Of course, there are alternatives to the use of a steel roller bearing as the wheel. For example, a roller bearing using some high temperature plastic parts or other metals could be used. Moreover, the elastomeric wheels described previously in conjunction with other embodiments are also suitable. At the present time, however, it is believed that relatively inexpensive steel rolling bearings are the best choice for the wheels used in the bearing 30 according to FIGS. 10 and 11.

As noted above, the wheel 337 of the bearing embodiment of FIGS. 10 and 11, is relatively rigid. Accordingly, the necessary resilience must be provided through the support of the shaft 39. One possibility in this regard is the shaft support shown and described in connection with FIG. 6 above. The preferred embodiment of FIGS. 10 and 11 uses a similar, but slightly different support. In particular, as best shown in FIG. 10 the shaft 39 is supported at its distal ends by end caps 38. While these end caps 38 could be elastomeric to provide some resilience, that is not necessary. Instead, according to the preferred embodiment, the end caps 38 are made of a high temperature substantially rigid material such as steel or plastic. As can be appreciated from FIG. 10, the end caps are spaced sufficiently far from the wheel that a significant portion of the shaft 39 is left unsupported. Since the shaft 39 is relatively thin, it is capable of bending or deflecting to provide the necessary resilience. Thus, in accordance with the preferred embodiment, the necessary resilience can be provided structurally by supporting the thin shaft 39 for deflection rather than providing resilient supports.

The bearing design shown in FIGS. 10–11 offers a number of manufacturing advantages. For example, the shaft 337 is mounted in a bore which extends as a secant through the support portion 33 of the bearing 3 such that the shaft 337 can be easily slid into the support portion 33. In addition, the end caps 38 which support the shaft 39 can be easily plugged into the support portion 33 as well. Thus, the assembly of FIGS. 10–11 is particularly easy to manufacture and assemble.

As described herein, the provision of the wheels at the outer periphery of the bearing 30 provides a significant advantage to the extent the wheels are resiliently mounted or resilient themselves. The outer periphery, which is defined by the outer edge of the wheels is in itself resilient or has a spring characteristic. The provision of this resilience or spring characteristic compensates for manufacturing tolerances, allows easy assembly and disassembly and ensures a tighter fit which permits high rotational speeds and eliminates the need for additional shims and compensates for thermal expansion. In accordance with another aspect of the present invention, these advantages can be achieved without the use of separate wheels.

For example, FIGS. 12–14 depict an embodiment in which the outer periphery is designed as a structural spring. Specifically, as shown in FIGS. 12–14, this is done by providing resilient elements in the form of resiliently mounted feet 43 at the outer periphery of the motor bearing. The feet 43 are provided on the unsupported end of cantilever beam-like extensions 42 that extend axially from the outer edge of the support portion 33 of the bearing 30. Because of the cantilever nature of their support, the feet 43 are resilient in the radial direction.

As shown in FIG. 12, the bearing assembly 30 is similar in many respect to the previously described bearing assemblies. For example, the bearing 30 includes a cylindrical sleeve portion 31 for supporting the rotating shaft. A radially outward extending support portion 33 extends radially outward from the sleeve portion 31 of the bearing 30. A plurality of passages or fill holes 35 extend through the support portion 33 to permit passage of oil contained within the housing 13.

In the embodiment of FIGS. 12–14, wheels are not provided at the outer periphery of the support portion 33. Instead, a plurality of axially extending cantilever beam-like portions 42 are provided as best shown in FIGS. 13, 13A and 14. The beam-like extensions 42 extend axially in both directions from the outer periphery of the support portion 33. As best shown in FIG. 12, the beam-like extensions are circumferentially spaced about the periphery of the support portion 33.

A foot portion 43 is provided at the distal or unsupported end of each of the cantilever beam-like extensions 42. As best shown in FIGS. 13 and 13A, the feet 43 define the outer periphery of the bearing 30. Since the feet 43 are supported at the unsupported end of a relatively thin cantilever beam 42, they are resiliently supported for movement radially inward. Thus, it can be readily appreciated that the feet 43 are capable of radially inward deflection to allow the bearing 32 to fit snugly into a stator. Once deflected radially inward, the feet 43 attempt to return to the original position and thus provide a snug fit against the stator 15. Thus, it can be appreciated that the bearing construction of FIGS. 12–14 provides the requisite resilience of the outer periphery of the bearing without providing wheels as in the other embodiments disclosed herein. Instead, the bearing of FIGS. 12–14 relies on the structural spring configuration provided by a cantilever beam-like extensions 42 and the feet 43.

Regardless of the specific way in which the resilience or spring characteristic is provided to the wheels 37, 137, 237, 337 or feet 43, the benefits are the same. In particular, provision of the spring characteristic compensates for manufacturing tolerances, allows easier assembly and disassembly and ensures a tighter fit which permits higher rotational speeds and eliminates the need for additional shims and compensates for thermo-expansion. It should be appreciated that the features shown with regard to different embodiments herein can be combined to achieve the combined benefits of the individual features.

What is claimed is:

1. An elongated electric motor comprising:

a tubular housing;

a stator mounted in said housing;

a shaft rotatably mounted within said stator;

a rotor composed of spaced apart rotor sections mounted on said shaft;

a plurality of spaced bearing assemblies, located between adjacent rotor sections for supporting the shaft, each of the bearing assemblies comprising: a sleeve portion for supporting the shaft, the sleeve portion having spaced longitudinal ends; a support portion extending from the sleeve portion, at a location spaced from the spaced longitudinal ends of the sleeve portion, radially outward from the sleeve portion toward the stator, the support portion having an outer periphery, the support portion having a radial dimension measured from the sleeve portion to the outer periphery and the support being substantially inflexible in the radial direction between the sleeve portion and the outer periphery, and resilient elements provided at the outer periphery of the support portion and extending radially outward of the outer periphery by a distance that is less than the radial dimension of the support portion such that the outer periphery of the bearing assembly is defined by the resilient elements so that the outer periphery of the bearing assembly may be moved radially inward without inward delection of the support portion.

2. The motor of claim 1, wherein the support portion is integrally formed as a single piece with the sleeve portion.

3. The motor of claim 1, wherein the support portion includes a plurality of fluid passages provided in the support portion at a location spaced radially inward of the outer periphery.

4. An elongated electric motor for a submersible pump, comprising in combination:

a housing filled with lubricating fluid;

a stator mounted in the housing and having an inner wall;

a rotatable shaft mounted within the stator;

a rotor composed of spaced-apart rotor sections mounted on the shaft;

a bearing mounted between each of the rotor sections, the bearing comprising a cylindrical sleeve portion having an inner diameter and a radially outward extending support portion that extends radially outward from the sleeve portion, the support portion having an outer periphery, the support portion being substantially inflexible in the radial direction between the sleeve portion and the outer periphery and the support portion including a plurality of fluid passages provided in the support portion at a location spaced radially inward of the outer periphery; and resilient means provided at the outer periphery of the support portion so that the resilient means define the outer periphery of the bearing whereby the outer periphery of the bearing may be moved radially inward.

5. The motor of claim 4, wherein the resilient means comprises a plurality of wheels carried by each of the bearings, the wheels being aligned to permit longitudinal movement, but inhibit rotation of the bearing relative to the stator and the wheels being radially movable.

6. The motor of claim 5, wherein each of the wheels is supported on a shaft that is supported so that the shaft can deflect under load to permit radially inward movement of the wheel.

7. The motor of claim 5, wherein each of the wheels comprises a roller bearing having an outer race that functions as the outer periphery of the wheel.

8. The motor of claim 7, wherein each of the wheels is formed of steel.

9. The motor of claim 4, wherein the resilient means comprises a structural spring provided at the outer periphery of the bearing.

10. The motor of claim 9, wherein the structural spring comprises: a plurality of resilient feet circumferentially spaced about the outer periphery of the bearing, a plurality of axially extending beam-like members extending axially from the outer periphery of the bearing, each of the beam-like members having a first end connected to the outer periphery of the bearing and a second end spaced from the outer periphery of the bearing, each of the feet being supported at the second end of one of the beam-like members in a cantilever fashion whereby the feet are resiliently supported by the beam-like members on the outer periphery of the bearing.

11. The motor of claim 4, wherein the support portion is integrally formed as a single piece with the sleeve portion.

12. An elongated electric motor for a submersible pump, comprising in combination:

a housing filled with lubricating fluid;

a stator mounted in the housing and having an inner wall;

a rotatable shaft mounted within the stator;

a rotor composed of spaced-apart rotor sections mounted on the shaft;

a bearing mounted between rotor sections, the bearing comprising a cylindrical sleeve portion having an inner diameter and a radially outward extending support portion that extends radially outward from the sleeve portion, the support portion having an outer periphery, the support portion being substantially inflexible in the radial direction between the sleeve portion and the outer periphery and the support portion including a plurality of fluid passages provided in the support portion at a location spaced radially inward of the outer periphery; and a plurality of resilient elements spaced about the outer periphery of the bearing, the resilient elements defining the radially outer most portion of the bearing and each of the resilient elements being movable radially inwardly.

13. The motor of claim 12, wherein the resilient elements comprise a plurality of wheels carried by each of the bearings, the wheels being aligned to permit longitudinal movement, but inhibit rotation of the bearing relative to the stator and the wheels being radially movable.

14. The motor of claim 13, wherein each of the wheels comprises a roller bearing having an outer race that functions as the outer periphery of the wheel.

15. The motor of claim 13, wherein each of the wheels is supported on a shaft that is supported so that the shaft can deflect under load to permit radially inward movement of the wheel.

16. The motor of claim 15, wherein each of the wheels is formed of steel.

17. The motor of claim 12, wherein the support portion is integrally formed as a single piece with the sleeve portion.

* * * * *